US011900243B2

(12) United States Patent
Wu et al.

(10) Patent No.: US 11,900,243 B2
(45) Date of Patent: Feb. 13, 2024

(54) SPIKING NEURAL NETWORK-BASED DATA PROCESSING METHOD, COMPUTING CORE CIRCUIT, AND CHIP

(71) Applicant: LYNXI TECHNOLOGIES CO., LTD., Beijing (CN)

(72) Inventors: Zhenzhi Wu, Beijing (CN); Yaolong Zhu, Beijing (CN); Luojun Jin, Beijing (CN); Wei He, Beijing (CN); Qikun Zhang, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/800,176

(22) PCT Filed: Apr. 22, 2021

(86) PCT No.: PCT/CN2021/089014
§ 371 (c)(1),
(2) Date: Aug. 16, 2022

(87) PCT Pub. No.: WO2021/213471
PCT Pub. Date: Oct. 28, 2021

(65) Prior Publication Data
US 2023/0099117 A1 Mar. 30, 2023

(30) Foreign Application Priority Data
Apr. 22, 2020 (CN) .......................... 202010324179.1

(51) Int. Cl.
*G06N 3/063* (2023.01)
*G06N 3/049* (2023.01)
(Continued)

(52) U.S. Cl.
CPC ............... *G06N 3/063* (2013.01); *G06F 9/00* (2013.01); *G06F 9/02* (2013.01); *G06N 3/049* (2013.01)

(58) Field of Classification Search
CPC .......... G06N 3/063; G06N 3/049; G06N 3/04; G06F 9/00; G06F 9/02
See application file for complete search history.

(56) References Cited

U.S. PATENT DOCUMENTS

| 10,317,930 B2 * | 6/2019 | Amir ...................... G06N 3/063 |
| 2010/0081958 A1 | 4/2010 | She |
| 2022/0188597 A1 * | 6/2022 | Richter .................. G06N 3/063 |

FOREIGN PATENT DOCUMENTS

| CN | 108830379 A | 11/2018 |
| CN | 109255430 A | 1/2019 |

(Continued)

OTHER PUBLICATIONS

Xu et al., "Boosting Throughput and Efficiency of Hardware Spiking Neural Accelerators Using Time Compression Supporting Multiple Spike Codes," in 14 Frontiers in Neuroscience 104 (2020). (Year: 2020).*

(Continued)

*Primary Examiner* — Kamran Afshar
*Assistant Examiner* — Ryan C Vaughn
(74) *Attorney, Agent, or Firm* — Li & Cai Intellectual Property (USA) Office

(57) ABSTRACT

A computing core circuit, including: an encoding module, a route sending module, and a control module, wherein the control module is configured to control the encoding module to perform encoding processing on a pulse sequence determined by pulses of at least one neuron in a current computing core to be transmitted, so as to obtain an encoded pulse sequence, and control the route sending module to determine a corresponding route packet according to the (Continued)

encoded pulse sequence, so as to send the route packet. The present disclosure further provides a data processing method, a chip, a board, an electronic device, and a computer-readable storage medium.

12 Claims, 8 Drawing Sheets

(51) Int. Cl.
 *G06F 9/00* (2006.01)
 *G06F 9/02* (2006.01)

(56) References Cited

FOREIGN PATENT DOCUMENTS

| CN | 109800872 A | 5/2019 |
| CN | 110633795 A | 12/2019 |

OTHER PUBLICATIONS

Lin et al., "A Scalable and Reconfigurable In-Memory Architecture for Ternary Deep Spiking Neural Network with ReRAM Based Neurons," in 375 Neurocomputing 102-12 (2020). (Year: 2020).*
Sengupta et al., "Spike-Time Encoding as a Data Compression Technique for Pattern Recognition of Temporal Data," in 406-07 Info. Sci. 133-45 (2017). (Year: 2017).*
WIPO, International Search Report dated Jul. 7, 2021.
China Patent Office, First Office Action dated Jul. 12, 2023 for application No. CN202010324179.1.

* cited by examiner

| Transmission density | Before compression (Bytes) | After compression (Bytes) | Saved operation volume (%) |
|---|---|---|---|
| Transmitted from 1% neurons | 128 | 12 | 90.63% |
| Transmitted from 5% neurons | 128 | 49 | 61.72% |
| Transmitted from 10% neurons | 128 | 96 | 25.00% |
| Transmitted from 1% neurons | 32 | 3 | 90.63% |
| Transmitted from 10% neurons | 32 | 13 | 59.38% |
| Transmitted from 20% neurons | 32 | 26 | 18.75% |

SPIKING NEURAL NETWORK-BASED DATA PROCESSING METHOD, COMPUTING CORE CIRCUIT, AND CHIP

CROSS-REFERENCE TO RELATED APPLICATIONS

The present application is a National Phase Application filed under 35 U.S.C. 371 as a national stage of PCT/CN2021/089014, filed on Apr. 22, 2021, an application claiming priority from Chinese Patent Application No. 202010324179.1, filed on Apr. 22, 2020 in the Chinese Intellectual Property Office, contents of which are hereby incorporated herein by reference in their entirety.

TECHNICAL FIELD

The present disclosure relates to a data processing method, and in particular relates to a data processing method based on a spiking neural network, a computing core circuit, an accelerated processing unit, a chip, a board card, an electronic device, and a computer-readable storage medium.

BACKGROUND

With continuous development of the field of deep learning technology, research in neural networks, especially in brain inspired computing, is rapidly developing due to wide applications to the fields of pattern recognition, intelligent robots, automatic control, prediction estimation, biology, medicine, economy, and the like. Neuromorphic chip-based brain inspired computing research with high processing efficiency has gained wide attention and applications.

SUMMARY

The present disclosure provides a data processing method based on a spiking neural network, a computing core circuit, an accelerated processing unit, a chip, a board card, an electronic device, and a computer-readable storage medium.

According to a first aspect of the embodiments of the present disclosure, there is provided a computing core circuit, including: an encoding module, a route sending module, and a control module, wherein the control module is configured to: control the encoding module to perform encoding processing on at least one second pulse sequence to obtain a third pulse sequence corresponding to each second pulse sequence, wherein the second pulse sequence includes a pulse of at least one neuron in the current computing core circuit to be transmitted, and the pulses to be transmitted in the second pulse sequence have consecutive transmitting addresses; control the route sending module to determine a second route packet corresponding to at least one third pulse sequence; and control the route sending module to send the second route packet to at least one destination computing core circuit.

Optionally, the control module is further configured to: control the encoding module to read a pulse sequence of the current computing core circuit to be transmitted, and determine at least one pulse to be transmitted with consecutive transmitting addresses in the pulse sequence to be transmitted as the second pulse sequence.

Optionally, values of the pulses in the second pulse sequence include a first value and a second value; and the control module is configured to: control the encoding module to determine a quantity of consecutive first values before each second value in the second pulse sequence, and determine, according to the quantities, the third pulse sequence corresponding to the second pulse sequence.

Optionally, the control module is configured to: control the route sending module to determine, according to the third pulse sequence and a second valid address, a second route packet corresponding to the third pulse sequence, wherein the second valid address is a transmitting address of a first reference pulse in the second pulse sequence.

Optionally, the computing core circuit further includes a route receiving module and an integration issuance processing module, and the control module is further configured to: control the route receiving module to receive a first route packet sent from at least one source computing core circuit, wherein the first route packet includes a first pulse sequence obtained by performing encoding processing on a fourth pulse sequence by a corresponding source computing core circuit, and the pulses in the fourth pulse sequence have consecutive transmitting addresses; control the integration issuance processing module to perform membrane potential integral operation on at least one first pulse sequence according to a corresponding synaptic weight matrix to obtain a corresponding membrane potential sequence formed by a membrane potential of at least one neuron in the current computing core circuit; and control the integration issuance processing module to determine, according to the at least one membrane potential sequence, a pulse sequence of the current computing core circuit to be transmitted.

Optionally, the computing core circuit further includes an address hopping control module, and the first route packet further includes a first valid address corresponding to the first pulse sequence, wherein the first valid address is a transmitting address of a second reference pulse in the fourth pulse sequence, and the control module is configured to: control the address hopping control module to determine, according to the first valid address and the first pulse sequence, an address of a synaptic weight valid row in the synaptic weight matrix, and determine a synaptic weight of the valid row; and control the integration issuance processing module to perform membrane potential integral operation according to the synaptic weight of the valid row to determine a membrane potential sequence corresponding to the first pulse sequence.

Optionally, the computing core circuit further includes a storage module configured to: store at least one of the pulse sequence to be transmitted and the third pulse sequence, wherein the pulse sequence to be transmitted includes at least one second pulse sequence.

According to a second aspect of the embodiments of the present disclosure, there is provided a data processing method based on a spiking neural network, including: performing encoding processing on at least one second pulse sequence to obtain a third pulse sequence corresponding to each second pulse sequence, wherein the second pulse sequence includes a pulse of at least one neuron in a current computing core circuit to be transmitted, and the pulses to be transmitted in the second pulse sequence have consecutive transmitting addresses; determining a second route packet corresponding to at least one third pulse sequence; and sending the second route packet to at least one destination computing core circuit.

Optionally, the method further includes: reading a pulse sequence of the current computing core circuit to be transmitted, and determining at least one pulse to be transmitted with consecutive transmitting addresses in the pulse sequence to be transmitted as the second pulse sequence.

Optionally, values of the pulses in the second pulse sequence include a first value and a second value; and performing encoding processing on at least one second pulse sequence to obtain the third pulse sequence corresponding to the second pulse sequence includes: determining a quantity of consecutive first values before each second value in the second pulse sequence, and determining, according to the quantities, the third pulse sequence corresponding to the second pulse sequence.

Optionally, determining the second route packet corresponding to at least one third pulse sequence includes: determining, according to the third pulse sequence and a second valid address, a second route packet corresponding to the third pulse sequence, wherein the second valid address is a transmitting address of a first reference pulse in the second pulse sequence.

Optionally, the method further includes: receiving a first route packet sent from at least one source computing core circuit, wherein the first route packet includes a first pulse sequence obtained by performing encoding processing on a fourth pulse sequence by a corresponding source computing core circuit, and the pulses in the fourth pulse sequence have consecutive transmitting addresses; performing membrane potential integral operation on at least one first pulse sequence according to a corresponding synaptic weight matrix to obtain a corresponding membrane potential sequence formed by a membrane potential of at least one neuron in the current computing core circuit; and determining, according to the at least one membrane potential sequence, a pulse sequence of the current computing core circuit to be transmitted.

Optionally, the first route packet further includes a first valid address corresponding to the first pulse sequence, wherein the first valid address is a transmitting address of a second reference pulse in the fourth pulse sequence, and performing membrane potential integral operation on at least one first pulse sequence according to the corresponding synaptic weight matrix to obtain the corresponding membrane potential sequence includes: determining, according to the first valid address and the first pulse sequence, an address of a synaptic weight valid row in the synaptic weight matrix, and determining a synaptic weight of the valid row; and performing membrane potential integral operation according to the synaptic weight of the valid row to determine the membrane potential sequence corresponding to the first pulse sequence.

Optionally, the method further includes: storing at least one of the pulse sequence to be transmitted and the third pulse sequence, wherein the pulse sequence to be transmitted includes at least one second pulse sequence.

According to a third aspect of the embodiments of the present disclosure, there is provided an accelerated processing unit, including a plurality of computing core circuits according to the first aspect.

According to a fourth aspect of the embodiments of the present disclosure, there is provided a chip, including at least one computing core circuit according to the first aspect, and a network-on-chip configured to establish a communication connection for the at least one computing core circuit.

According to a fifth aspect of the embodiments of the present disclosure, there is provided a board card, including at least one chip according to the fourth aspect.

According to a fifth aspect of the embodiments of the present disclosure, there is provided an electronic device, including at least one chip according to the fourth aspect.

According to a sixth aspect of the embodiments of the present disclosure, there is provided an electronic device, including: a processor; and a memory storing instructions executable by the processor, wherein the processor is configured to execute the instructions stored in the memory to perform the method according to the second aspect.

According to a seventh aspect of the embodiments of the present disclosure, there is provided a computer-readable storage medium having computer program instructions stored thereon, wherein the computer program instructions, when executed by a processor, cause the method according to the second aspect to be implemented.

BRIEF DESCRIPTION OF DRAWINGS

The above and other objects, features and advantages of the present disclosure will become more apparent from the following description of the embodiments of the present disclosure with reference to the accompanying drawings, in which.

DETAILED DESCRIPTION OF EMBODIMENTS

Figure 1:
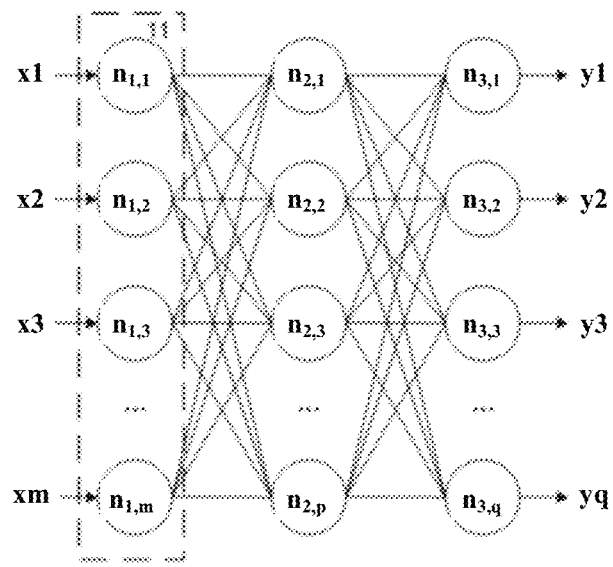
FIG. 1 is a schematic structural diagram of a spiking neural network according to the present disclosure.

The present disclosure is described below based on embodiments, but the present disclosure is not limited solely to these embodiments. In the following detailed description of the present disclosure, some specific details are set forth in detail. One skilled in the art may thoroughly understand the present disclosure even without these specific details. Well-known methods, procedures, flows, elements and circuits are described in detail herein so as not to obscure the essence of the present disclosure.

Furthermore, those of ordinary skill in the art will appreciate that the drawings provided herein are for the purpose of illustrating the present disclosure and are not necessarily drawn to scale.

Meanwhile, it will be appreciated that in the following description, the term "circuit" refers to a conductive loop constituted by at least one element or sub-circuit connected through electrical connection or electromagnetic connection. When an element or circuit is referred to as being "connected to" another element or element/circuit, it means that the element or circuit may be directly coupled or connected to another element or an intermediate element may be present, and the connection between the elements may be a physical connection, logical connection, or a combination thereof. In contrast, when an element is referred to as being "directly coupled" or "directly connected" to another element, it means that no intermediate element is present between the two elements.

Unless the context clearly requires otherwise, throughout the description, the words "comprise", "include", and the like are to be construed in an inclusive sense as opposed to an exclusive or exhaustive sense; that is to say, in the sense of "including, but not limited to."

In the description of the present disclosure, it is to be understood that the terms "first," "second," and the like are used for descriptive purposes only and are not to be construed as indicating or implying relative importance. In addition, in the description of the present disclosure, "a plurality" means two or more unless otherwise specified.

Brain inspired computing (BIC) constructs an electronic brain similar to a biological brain by simulating an operation mechanism of a biological brain, and is used in data processing with high accuracy and processing efficiency. Since the architecture based on the Von Neumann architecture has limited support for BIC, the application range of neural networks is limited and the energy efficiency is relatively low. Therefore, to obtain a new architecture system that more closely matches neural computing, neuromorphic chips (e.g., brain inspired computing chips) have come into play. The neuromorphic chip typically has a many-core structure, with each computing core circuit (also referred to below as a computing core) including a set of neurons capable of simulating behavior of a biological neuron cluster. Each computing core in the neuromorphic chip can complete a dendrite integral operation process and a soma operation process for a set of neurons.

FIG. 1 is a schematic structural diagram of a spiking neural network according to the present disclosure. It will be readily appreciated that the structure of the spiking neural network shown in FIG. 1 (including the number of layers and the number of neurons) is merely schematic. The spiking neural network shown in FIG. 1 is a three-layer structure, in which each layer structure may correspond to one of the computing cores in the neuromorphic chip, an input of each neuron is a pulse, and the output is also a pulse. Taking a first layer structure as an example, a computing core 11 includes m neurons $n_{1,1}$ to $n_{1,m}$ (m is a predetermined integer equal to or greater than 1). Taking the second layer structure being a current computing core as an example for explanation, after receiving pulses to be transmitted generated by the neurons in the computing core 11 (that is, the source computing core) (when the pulse to be transmitted is 0, it is also regarded as receiving the pulse to be transmitted), a neuron $n_{2,1}$ in the current computing core performs the dendrite integral operation on a corresponding pulse sequence to be transmitted in the computing core 11 to obtain a membrane potential corresponding to the neuron $n_{2,1}$, and then performs the soma operation according to the membrane potential to obtain a pulse to be transmitted corresponding to the neuron $n_{2,1}$. Since the spiking neural network supports parallel computation, the neurons in a same computing core (for example, the second layer structure) may perform the dendrite integral operation process and the soma operation process in parallel. For example, the neurons in the current computing core may obtain corresponding membrane potentials, and thus corresponding pulses to be transmitted, at the same time, and then a pulse sequence to be transmitted corresponding to the current computing core is determined according to the pulse to be transmitted corresponding to each neuron in the current computing core.

It will be readily appreciated that the spiking neural network shown in FIG. 1 is a fully connected spiking neural network, and therefore, the neurons in each layer structure may belong to a same computing core. If the spiking neural network is a partially connected spiking neural network with each part fully connected, the neurons in a same layer structure of each part of the spiking neural network may belong to a same computing core.

For each neuron in the computing core, the dendrite integral operation process is configured to describe a process of integrating pulse data of all input axons connected to dendrites of the neuron. The soma operation process is configured for updating membrane potentials of neurons and judging transmission of pulses. If the membrane potential of any neuron meets a transmission condition, an axon of the neuron transmits a pulse represented by 1 to a subsequent neuron connected to the neuron; otherwise, the axon of the neuron transmits a pulse represented by 0 to the subsequent neuron connected to the neuron. As a result, the neuromorphic chip, as a very-large-scale integrated system of an electronic analog circuit, can simulate the neurobiological structure in a nervous system in a relatively accurate manner.

However, due to a large number of neurons in one computing core, each computing core in the neuromorphic chip typically needs to transmit a large amount of pulse data in inter-core routing, and since the spiking neural network has connection sparsity and transmission sparsity, 0 takes a far greater proportion than 1 in the pulse data output from each computing core. Further, in the dendrite integral operation process, the operation is performed no matter whether the pulse data is 0 or 1, thus consuming a large amount of computing resources. Therefore, the data processing efficiency of the existing neuromorphic chips still needs to be improved.

Figure 2:
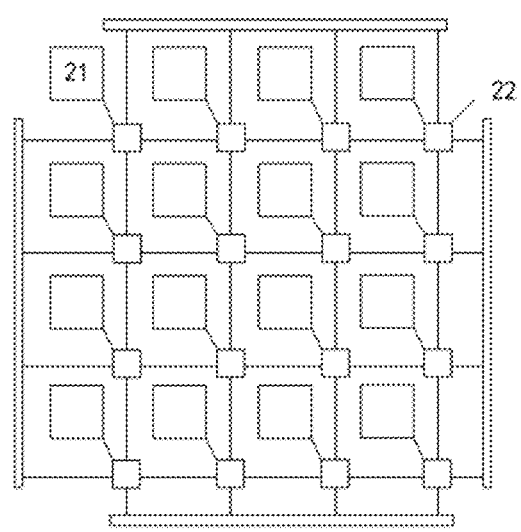
FIG. 2 is a schematic structural diagram of a neuromorphic chip according to the present disclosure.

FIG. 2 is a schematic structural diagram of a neuromorphic chip according to the present disclosure. As shown in FIG. 2, the neuromorphic chip of the present disclosure may include at least one computing core (typically a plurality of computing cores) 21, and a network-on-chip (NoC) 22 configured to establish communication connections for the computing core 21. Each computing core 21 may process interconnection of N neurons with N×N neurons, where N is a positive integer greater than 1. In other words, one computing core circuit may process membrane potentials of a plurality of neurons. The NoC 22 is a communication method for a system-on-chip (i.e., a complete system integrated on a single chip), as well as a major component of a many-core technology. The NoC helps to simplify hardware desired by the routing and data exchange functions, can provide multi-topology and multi-option support for different areas of the network, and has the characteristics of strong expandability, interoperability, and the like. Optionally, because the NoC architecture may be based on different technologies, the neuromorphic chip of the present disclosure may employ an electrical NoC (ENoC) based on electronic technology, or an optical NoC (ONoC) based on optical technology.

Figure 3:
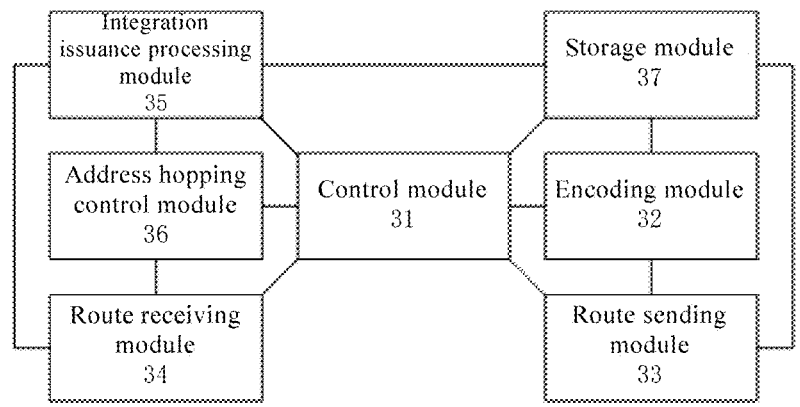
FIG. 3 is a schematic structural diagram of a computing core circuit according to the present disclosure.

FIG. 3 is a schematic structural diagram of a computing core circuit according to the present disclosure. The structure shown in FIG. 3 may be employed for any computing core circuit in embodiments of the present disclosure. As shown in FIG. 3, the computing core circuit of the present disclosure includes at least a control module 31, an encoding module 32, and a route sending module 33. The control module 31 is configured to control the encoding module 32 to perform encoding processing on at least one second pulse sequence to obtain a third pulse sequence corresponding to each second pulse sequence, control the route sending module 33 to determine, according to each third pulse sequence, at least one second route packet, and control the route sending module 33 to send the second route packet to at least one destination computing core circuit. The second pulse sequence includes a pulse of at least one neuron in the current computing core circuit to be transmitted, and the pulses to be transmitted in the second pulse sequence have consecutive transmitting addresses.

In an implementation of the present disclosure, the control module 31 is further configured to control the encoding module 32 to read at least one pulse to be transmitted with consecutive transmitting addresses in the pulse sequence of the current computing core circuit to be transmitted, and determine the at least one pulse to be transmitted as a second pulse sequence.

In an implementation of the present disclosure, values of the pulses in the second pulse sequence include a first value and a second value. The control module 31 is configured to control the encoding module 32 to determine a quantity of consecutive first values before each second value in the second pulse sequence, and determine, according to the quantities, a corresponding third pulse sequence.

In an implementation of the present disclosure, the control module 31 is configured to control the route sending module 33 to determine, according to the third pulse sequence and a corresponding second valid address, a corresponding second route packet. The second valid address is a transmitting address of a first reference pulse in the second pulse sequence.

In an implementation of the present disclosure, the computing core circuit may further include a route receiving module 34 and an integration issuance processing module 35. The control module 31 is further configured to control the route receiving module 34 to receive a first route packet sent from at least one source computing core circuit, control the integration issuance processing module 35 to perform membrane potential integral operation on at least one first pulse sequence according to a corresponding synaptic weight matrix to obtain a corresponding membrane potential sequence, and control the integration issuance processing module 35 to determine, according to the at least one membrane potential sequence, a pulse sequence of the current computing core circuit to be transmitted. The first route packet includes a first pulse sequence obtained by performing encoding processing on a fourth pulse sequence by a corresponding source computing core circuit, and the pulses in the fourth pulse sequence have consecutive transmitting addresses. The membrane potential sequence is formed by a membrane potential of at least one neuron in the current computing core circuit.

In an implementation of the present disclosure, the computing core circuit further includes an address hopping control module 36, and the first route packet further includes a first valid address corresponding to the first pulse sequence. The first valid address is a transmitting address of a second reference pulse in the fourth pulse sequence. The control module 31 is configured to control the address hopping control module 36 to determine, according to the first valid address and the first pulse sequence, an address of a synaptic weight valid row in the synaptic weight matrix and a synaptic weight of the valid row; and control the integration issuance processing module 35 to perform membrane potential integral operation according to the synaptic weight of the valid row to determine the membrane potential sequence corresponding to the first pulse sequence.

In an implementation of the present disclosure, the computing core circuit further includes a storage module 37. The storage module 37 is configured to store at least one of the pulse sequence to be transmitted and the third pulse sequence.

It will be readily appreciated that in the embodiments of the present disclosure, the integration issuance processing module 35 shown in FIG. 3 is a circuit module capable of performing the dendrite integral operation process and the soma operation process on neurons in a neural network, and is configured to simulate a dendrite portion and a soma portion in the neural network. The control module 31, the encoding module 32, the route sending module 33, the route receiving module 34, the integration issuance processing module 35, the address hopping control module 36, and the storage module 37 shown in FIG. 3 each may be implemented in a corresponding dedicated logic circuit. During inter-core data transmission of computing cores, a current computing core may control the route sending module 33 to send a route packet to a NoC through the control module 31 of the current computing core, and a destination computing core may control the route receiving module 34 to receive the route packet from the NoC through the control module 31 of the destination computing core, thereby completing the inter-core data transmission.

The computing core circuit of the present disclosure includes: an encoding module, a route sending module, and a control module. The control module is configured to control the encoding module to perform encoding processing on a pulse sequence determined by a pulse of at least one neuron in a current computing core to be transmitted to obtain an encoded pulse sequence, and determine a corresponding route packet according to the encoded pulse sequence to send the route packet. The computing core circuit of the present disclosure performs encoding processing on the pulse sequence before data transmission, thereby reducing the amount of pulse data desired to be transmitted in data transmission, and effectively improving the processing efficiency of the neuromorphic chip on pulse data.

Accordingly, the present disclosure provides an accelerated processing unit, including a plurality of computing core circuits as described above. For the description of the computing core circuits, reference may be made to the above and details are not repeated here.

The data processing method based on a spiking neural network according to the present disclosure is described in detail below through method embodiments.

Figure 4:
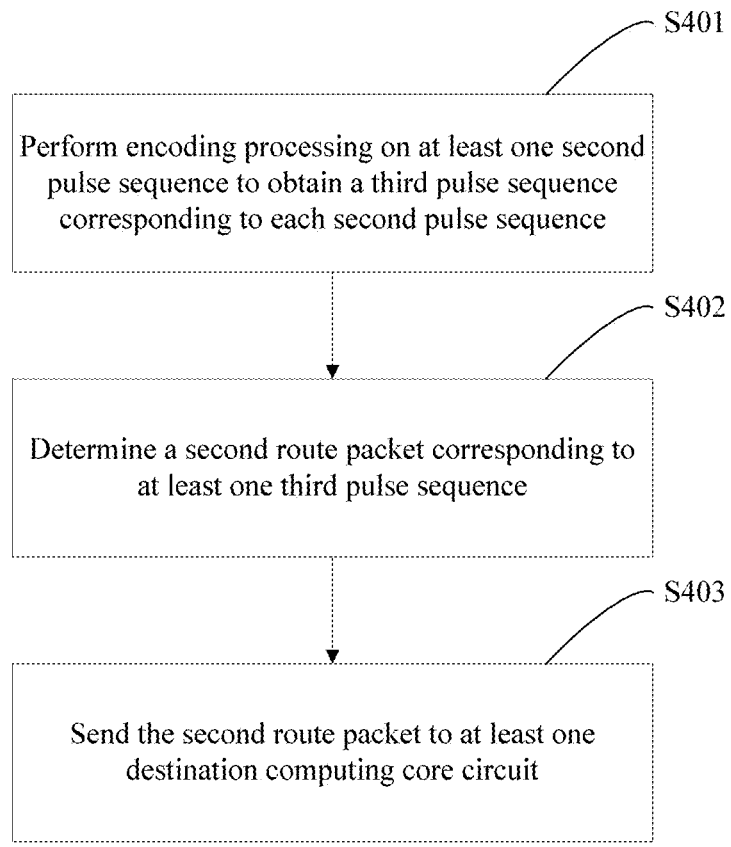
FIG. 4 is a flowchart of a data processing method based on a spiking neural network according to the present disclosure.

FIG. 4 is a flowchart of a data processing method based on a spiking neural network according to the present disclosure. As shown in FIG. 4, the method includes the following operations S401 to S403.

At operation S401, encoding processing is performed on at least one second pulse sequence to obtain a third pulse sequence corresponding to each second pulse sequence.

In the present disclosure, the second pulse sequence includes a pulse of at least one neuron in a current computing core to be transmitted, and the pulses to be transmitted in the second pulse sequence have consecutive transmitting addresses. The pulses to be transmitted having consecutive transmitting addresses means that the pulses to be transmitted correspond to a same destination computing core, and correspond to axons of the neuron at consecutive positions. When the neuromorphic chip receives data input, each computing core can output a pulse to be transmitted at a pulse transmission time. The pulses to be transmitted in the second pulse sequence correspond to a same pulse transmission time.

For example, if neurons 1 to 50 in a computing core 1 are connected to a computing core 2, and neurons 51 to 100 in the computing core 1 are connected to a computing core 3, then among the pulses to be transmitted generated by the neurons 1 to 50 at one pulse transmission time: pulses 1 to 50 have consecutive transmitting addresses, and the pulses 1 to 50 correspond to one second pulse sequence; and among the pulses to be transmitted generated by neurons 51 to 100 at one pulse transmission time: pulses 51 to 100 have consecutive transmitting addresses, and the pulses 51 to 100 correspond to one second pulse sequence. It will be appreciated that the number of pulses to be transmitted in different second pulse sequences may be the same or different.

In an implementation, performing encoding processing on at least one second pulse sequence may include determining at least one pulse to be transmitted with consecutive transmitting addresses in the pulse sequence of the current computing core to be transmitted as the second pulse sequence, and performing encoding processing on the second pulse sequence to obtain the third pulse sequence corresponding to the second pulse sequence. When determining the second pulse sequence, a plurality of second pulse sequences of the current computing core circuit may be determined simultaneously, or each second pulse sequence of the current computing core circuit may be determined sequentially, which is not limited in the present disclosure.

In an implementation, performing encoding processing on at least one second pulse sequence may be implemented by determining, when the pulses to be transmitted in the pulse sequence of the current computing core to be transmitted are read sequentially, if a current pulse to be transmitted and a previous pulse to be transmitted have consecutive transmitting addresses, that the current pulse to be transmitted is a pulse in the current second pulse sequence; performing encoding processing while reading the current pulse to be transmitted to obtain an intermediate encoded result, and obtaining a final encoded result when a last pulse of the current second pulse sequence is determined; and determining the third pulse sequence corresponding to the second pulse sequence according to the final encoded result.

For example, as described above, the neurons 1 to 50 in the computing core 1 are connected to the computing core 2, and the pulses 1 to 50 have consecutive transmitting addresses. When it is read that the pulse of neuron 2 in the computing core 1 to be transmitted and the pulse of neuron 1 in the computing core 1 to be transmitted have consecutive transmitting addresses, it is determined that the pulses of neuron 2 and neuron 1 in the computing core 1 to be transmitted are two pulses in the current second pulse sequence, and thus, when the pulse of neuron 2 to be transmitted is read, encoding processing can be performed according to the pulses of neuron 1 and neuron 2 in the computing core 1 to be transmitted. By analogy, when it is read that a transmitting address of the pulse of neuron 51 in the computing core 1 to be transmitted is not consecutive with a transmitting address of the pulse of neuron 50 to be transmitted, it is determined that the pulse 50 is the last pulse in the current second pulse sequence, and the pulses 1 to 50 are in a same second pulse sequence. Therefore, the encoded result obtained when the pulse 50 is read can be determined as the encoded result of the second pulse sequence including the pulses 1 to 50, and the third pulse sequence corresponding to the second pulse sequence is determined.

It will be appreciated that as long as the second pulse sequence including the pulses to be transmitted with consecutive transmitting addresses is performed with the encoding processing, the manner and time for determining the second pulse sequence and the manner and time for performing encoding processing are not limited in the present disclosure.

In an implementation, the pulse to be transmitted may include two values, for example, a first value and a second value, where the first value may be represented by 0, and the second value may be represented by 1. Due to the transmission sparsity of the spiking neural network, the two values typically differ greatly in quantity in each second pulse sequence.

For ease of understanding, the following description is made by taking a case where the quantity of the first values (0) is greater than the quantity of the second values (1) as an example. In operation S401, the control module of the current computing core may control the encoding module to perform encoding processing on at least one second pulse sequence in a compressed encoding mode based on the quantity of consecutive 0s, and determine the third pulse sequence corresponding to the second pulse sequence so as to effectively reduce the transmitted data amount in later inter-core data transmission (i.e., a data transmission process between different computing cores), and increase the data transmission rate. It will be appreciated that when the quantity of values 1 in the second pulse sequence is greater than the quantity of values 0, the encoding may be performed in the compressed encoding mode based on the quantity of consecutive 1s.

The following describes an encoding process in the compressed encoding mode based on the quantity of consecutive 0s. c is the quantity of consecutive 0s in the second pulse sequence, and has an initial value 0. After traversing all pulses to be transmitted in the second pulse sequence, and for the $i^{th}$ pulse to be transmitted Di in the second pulse sequence (i∈[1,n], n is the total number of the pulses to be transmitted in the second pulse sequence), if Di=1, then the $j^{th}$ element Tj=c in the third pulse sequence is output, and c=0, j=j+1; if Di=0, then c=c+1. In other words, for each second pulse sequence, the control module may determine a quantity of consecutive first values before each second value in the second pulse sequence through the encoding module, and determine, according to the quantities corresponding to each second pulse sequence, a corresponding third pulse sequence. For example, the quantities may be represented in binary as the third pulse sequence corresponding to the second pulse sequence. The quantity of consecutive first values before each second value refers to the number of first values (0) continuously set before each second value (1) in the second pulse sequence.

Optionally, an allowable bit width for each element in the third pulse sequence may be further limited, and the bit width may be configured to limit a maximum quantity of consecutive first values. The following also describes the encoding process in the compressed encoding mode based on the quantity of consecutive 0s in combination with the second pulse sequence and the third pulse sequence. m is an allowable bit width for each element in the third pulse sequence, and m is a predetermined integer equal to or greater than 1. If the quantity of consecutive 0s in the second pulse sequence c=$2^m$−1, then the $j^{th}$ element in the third pulse sequence, Tj=c, is output, and after that, c=0, j=j+1. That is, if the bit width is m, the maximum quantity of consecutive first values does not exceed $2^m-1$. Meanwhile, due to the limitation of the spiking neural network, the pulse to be transmitted is actually 0 or 1. Therefore, the control module may control the encoding module to output the quantities corresponding to each second pulse sequence in a binary format to determine the corresponding third pulse sequence.

For example, the second pulse sequence is 00000000000000000010000000000000001, and the preset bit width m is 4, then the quantity of consecutive 0s does not exceed 15. For the first 1 (i.e., the 19th bit from left) in the second pulse sequence, there are 18 consecutive 0s in front, so for the first 1, the quantities of consecutive 0s is 15 and 3. For the second 1 (i.e., the 35th bit from left) in the second pulse sequence, there are 15 consecutive 0s in front, so for the second 1, the quantity of consecutive 0s is 15. Therefore, the control module may control the encoding module to output 15, 3 and 15 in binary according to the bit width m, and thus obtain the third pulse sequence 111100111111 corresponding to the second pulse sequence.

In actual operation of the neuromorphic chip, each neuron in each computing core may generate a pulse to be transmitted at each pulse transmission time. Therefore, in an implementation of the present disclosure, before the operation S401, the control module may further control the encoding module to read a sequence (i.e., a pulse sequence to be transmitted) formed by the pulses to be transmitted and generated from the neurons in the current computing core, and determine at least one pulse to be transmitted with consecutive transmitting addresses in the pulse sequence to be transmitted as the second pulse sequence.

It will be readily appreciated that if all pulses to be transmitted in the pulse sequence to be transmitted have consecutive transmitting addresses, the second pulse sequence is the pulse sequence to be transmitted.

At operation S402, a second route packet corresponding to at least one third pulse sequence is determined.

In this operation, the control module may control the route sending module to determine, according to the third pulse sequence and a corresponding second valid address, a second route packet corresponding to the third pulse sequence. In the present disclosure, the second valid address is configured to represent a transmitting address of a first reference pulse in the second pulse sequence, and the first reference pulse may be a first or last pulse to be transmitted in the second pulse sequence. Since pulses to be transmitted in the second pulse sequence have consecutive transmitting addresses, the control module in the destination computing core may determine a corresponding destination neuron of each pulse to be transmitted in the destination computing core as long as the transmitting address of the first or last pulse to be transmitted is known. Therefore, compared with the mode of determining the second route packet according to the third pulse sequence and the transmitting address corresponding to each pulse to be transmitted in the second pulse sequence, the data amount of the second route packet in the subsequent inter-core data transmission is effectively reduced, and the transmission rate of the second route packet is increased.

At operation S403, the second route packet is sent to at least one destination computing core circuit.

After determining the at least one second route packet, the control module may control the route sending module to determine, according to a second valid address corresponding to the at least one second route packet, a computing core corresponding to the second valid address as the destination computing core, and send the corresponding second route packet to the destination computing core. For example, the second route packet may be sent to a NoC, and then transmitted to the destination computing core.

In the present disclosure, a pulse sequence determined by a pulse of at least one neuron in a current computing core to be transmitted is encoded to obtain the encoded pulse sequence, and a corresponding route packet is determined according to the encoded pulse sequence to send the route packet. According to the data processing method based on a spiking neural network of the present disclosure, the pulse sequence is encoded before data transmission, and the pulse sequence with consecutive transmitting addresses is compressed and expressed by means of the sparsity of neuron transmission, thereby reducing the amount of pulse data desired to be transmitted in data transmission, significantly reducing the communication transmission overhead, and effectively improving the processing efficiency of the neuromorphic chip on pulse data.

Figure 5:
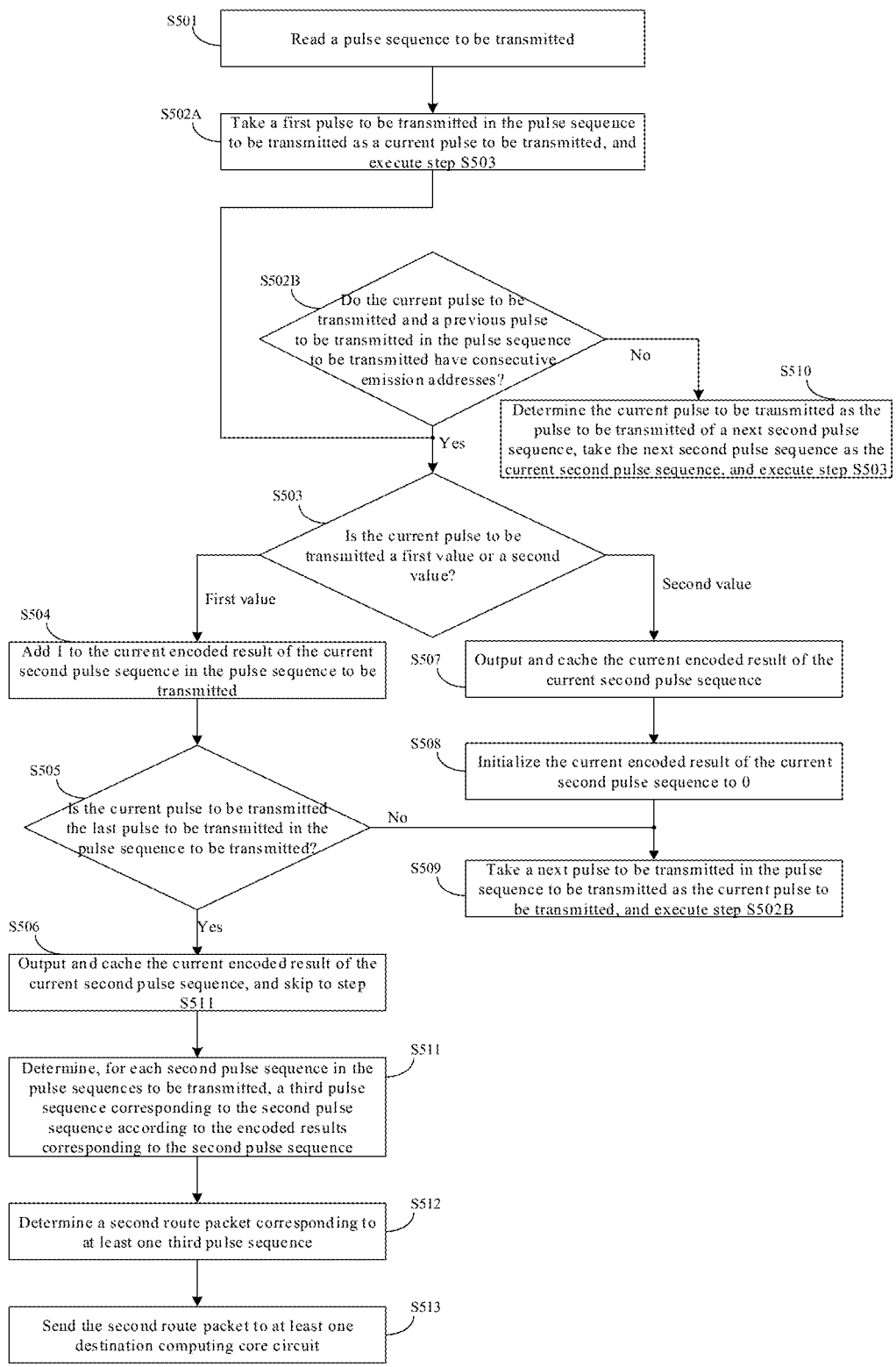
FIG. 5 is a flowchart of a data processing method based on a spiking neural network according to the present disclosure.

FIG. 5 is a flowchart of a data processing method based on a spiking neural network according to the present disclosure. As shown in FIG. 5, the method may include the following operations S501 to S513.

At operation S501, a pulse sequence to be transmitted is read.

In this operation, the control module may control the encoding module to read pulses to be transmitted generated from neurons in a current computing core at each pulse transmission time, and determine, for each pulse transmission time, a pulse sequence to be transmitted corresponding to the pulse transmission time according to each pulse to be transmitted read at the pulse transmission time.

At operation S502A, a first pulse to be transmitted in the pulse sequence to be transmitted is taken as a current pulse to be transmitted, the first pulse to be transmitted is taken as the pulse to be transmitted in a current second pulse sequence in the pulse sequence to be transmitted, and operation S503 is executed.

In this operation, in the pulse sequence to be transmitted, the pulses to be transmitted are sorted according to an order of transmitting addresses. Initially, the first pulse to be transmitted in the pulse sequence to be transmitted is determined as the current pulse to be transmitted, the first pulse to be transmitted (the current pulse to be transmitted) is taken as a pulse to be transmitted in a first second pulse sequence (the current second pulse sequence) in the pulse sequence to be transmitted, and operation S503 is executed. Starting from a second pulse to be transmitted, operation S502B is executed when each pulse to be transmitted is taken as the current pulse to be transmitted. Initially, the current encoded result of the current second pulse sequence in the pulse sequence to be transmitted is initialized to 0.

At operation S502B, it is identified whether the current pulse to be transmitted and a previous pulse to be transmitted in the pulse sequence to be transmitted have consecutive transmitting addresses, and operation S503 is executed if the current pulse to be transmitted and the previous pulse to be transmitted in the pulse sequence to be transmitted have consecutive addresses; otherwise, operation S510 is executed.

If the current pulse to be transmitted and the previous pulse to be transmitted have consecutive transmitting addresses, it indicates that the current pulse to be transmitted and the previous pulse to be transmitted both belong to the current second pulse sequence in the pulse sequence to be transmitted, so operation S503 is executed to further identify a value of the current pulse to be transmitted to perform compressed encoding processing. If the current pulse to be transmitted and the previous pulse to be transmitted do not have consecutive transmitting addresses, it indicates that the current pulse to be transmitted and the previous pulse to be transmitted do not belong to a same current second pulse sequence, and need to be compressed encoded, respectively, so operation S510 is executed.

At operation S503, it is identified whether the current pulse to be transmitted is a first value or a second value, operation S504 is executed if the current pulse to be transmitted is the first value, and operation S507 is executed if the current pulse to be transmitted is the second value.

In this operation, the first value is 0, and the second value is 1. In the present disclosure, a compressed encoding mode based on a quantity of consecutive 0s is adopted for performing encoding processing so that when it is identified that the current pulse to be transmitted is the first value (0), operation S504 is executed to count the quantity of consecutive first values (0) before each second value (1) in the current second pulse sequence. The current encoded result of the current second pulse sequence is configured to indicate the quantity of consecutive first values (0) before each second value (1) in the current second pulse sequence.

At operation S504, 1 is added to the current encoded result of the current second pulse sequence in the pulse sequence to be transmitted.

At operation S505, it is determined whether the current pulse to be transmitted is the last pulse to be transmitted in the pulse sequence to be transmitted, and operation S506 is executed if the current pulse to be transmitted is the last pulse to be transmitted in the pulse sequence to be transmitted; otherwise, operation S509 is executed.

At operation S506, the current encoded result of the current second pulse sequence is output and cached, and skip to operation S511.

At operation S507, the current encoded result of the current second pulse sequence is output and cached.

It will be readily appreciated that if the current pulse to be transmitted is the first pulse to be transmitted in the pulse sequence to be transmitted and the first pulse to be transmitted is the second value, the current second pulse sequence includes only the first pulse to be transmitted, and the current encoded result of the current second pulse sequence, i.e., the quantity of consecutive first values before the first pulse to be transmitted, is 0.

At operation S508, the current encoded result of the current second pulse sequence is initialized to 0.

At operation S509, a next pulse to be transmitted in the pulse sequence to be transmitted is taken as the current pulse to be transmitted, and operation S502B is executed.

At operation S510, the current pulse to be transmitted is determined as the pulse to be transmitted in a next second pulse sequence, the next second pulse sequence is taken as the current second pulse sequence, the current encoded result of the current second pulse sequence is initialized to 0, and operation S503 is executed.

If the current pulse to be transmitted and the previous pulse to be transmitted do not have consecutive transmitting addresses, it indicates that the current pulse to be transmitted and the previous pulse to be transmitted do not belong to a same current second pulse sequence, and need to be compressed encoded, respectively. That is, it indicates that the quantity of consecutive 0s in the second pulse sequence to which the previous pulse to be transmitted belongs is finished now, so the current pulse to be transmitted is determined as a pulse to be transmitted in the next second pulse sequence in the pulse sequence to be transmitted, the next second pulse sequence is taken as the current second pulse sequence, the current encoded result of the current second pulse sequence is initialized to 0, and operation S503 is executed to implement counting of consecutive 0s in the next second pulse sequence and thus compressed encoding of the next second pulse sequence.

At operation S511, for each second pulse sequence in the pulse sequence to be transmitted, a third pulse sequence corresponding to the second pulse sequence is determined according to the encoded results corresponding to the second pulse sequence.

According to the above operations S502A to S510, dividing of second pulse sequences in the pulse sequence to be transmitted can be implemented to determine at least one second pulse sequence in the pulse sequence to be transmitted, and counting of consecutive 0s in each of the at least one second pulse sequence is implemented to finally output at least one encoded result corresponding to each second pulse sequence. For each second pulse sequence, each encoded result of the second pulse sequence indicates the quantity of consecutive first values (0) before each second value (1) in the second pulse sequence.

Specifically, in this operation, each encoded result corresponding to the second pulse sequence is represented in binary to obtain a binary representation corresponding to the encoded result, thereby obtaining a third pulse sequence corresponding to the second pulse sequence.

For example, at a certain pulse transmission time, the current computing core corresponds to a pulse sequence to be transmitted 00001000100000010000000000000001, and according to the above operations S502A to S510, it is determined that the 1st to 16th pulses to be transmitted (from left to right) have consecutive addresses, the 17th to 32nd pulses to be transmitted (from left to right) have consecutive addresses, the first second pulse sequence in the pulse sequence to be transmitted includes the 1st to 16th pulses to be transmitted, the second second pulse sequence includes the 17th to 32nd pulses to be transmitted, the first second pulse sequence corresponds to final encoded results 4, 3, and 6, and the second second pulse sequence corresponds to a final encoded result 15. Specifically, according to the above operations S502A to S510, when the current pulse to be transmitted is the 1st pulse to be transmitted, since the 1st pulse to be transmitted is 0, the current encoded result corresponding to the first second pulse sequence is counted as 1. When the current pulse to be transmitted is the 2nd pulse to be transmitted, since the 2nd current pulse to be transmitted and the 1st pulse to be transmitted have consecutive transmitting addresses, and the 2nd pulse to be transmitted is 0, the current encoded result corresponding to the first second pulse sequence is counted as 2. By analogy, when the current pulse to be transmitted is the 5th pulse to be transmitted, since the 5th current pulse to be transmitted and the 4th pulse to be transmitted have consecutive transmitting addresses, and the 5th pulse to be transmitted is 1, the current encoded result corresponding to the first second pulse sequence is output, and in this case, the current encoded result corresponding to the first second pulse sequence is counted as 4.

By analogy, when the current pulse to be transmitted is the 6th pulse to be transmitted, the current encoded result corresponding to the first second pulse sequence is recounted. When the current pulse to be transmitted is the 9th pulse to be transmitted, since the 9th current pulse to be transmitted and the 8th pulse to be transmitted have consecutive transmitting addresses, and the 9th pulse to be transmitted is 1, the current encoded result corresponding to the first second pulse sequence is output, and in this case, the current encoded result corresponding to the first second pulse sequence is counted as 3.

By analogy, when the current pulse to be transmitted is the 10th pulse to be transmitted, the current encoded result corresponding to the first second pulse sequence is recounted. When the current pulse to be transmitted is the 16th pulse to be transmitted, since the 16th current pulse to be transmitted and the 15th pulse to be transmitted have consecutive transmitting addresses, and the 16th pulse to be transmitted is 1, the current encoded result corresponding to the first second pulse sequence is output, and in this case, the current encoded result corresponding to the first second pulse sequence is counted as 6.

When the current pulse to be transmitted is the 17th pulse to be transmitted, since the 16th current pulse to be transmitted and the 17th pulse to be transmitted do not have consecutive transmitting addresses, it indicates that the 17th pulse to be transmitted and the 16th pulse to be transmitted belong to different second pulse sequences, and the control module may control the encoding module to output the encoded results 4, 3 and 6 corresponding to the first second pulse sequence, and determine, according to the encoded results 4, 3 and 6 corresponding to the first second pulse sequence, that a third pulse sequence corresponding to the 1st to 16th neurons (the $i^{th}$ neuron generates the $i^{th}$ pulse to be transmitted) in the current computing core at the pulse transmission time is 010000110110, and simultaneously control the encoding module to initialize to count consecutive 0s in the second second pulse sequence starting from the 17th pulse to be transmitted, thereby determining an encoded result corresponding to the second second pulse sequence.

It will be readily appreciated that the pulse sequence to be transmitted includes at least one second pulse sequence. Therefore, the above encoding processing on the pulse sequence to be transmitted (i.e., operations S501 to S511) may be regarded as the encoding processing on the at least one second pulse sequence to obtain the third pulse sequence corresponding to each second pulse sequence.

At operation S512, a second route packet is determined corresponding to at least one third pulse sequence.

In the present disclosure, operation S512 is implemented in a manner similar to operation S402, and thus is not repeated here.

At operation S513, the second route packet is sent to at least one destination computing core circuit.

In the present disclosure, operation S513 is implemented in a manner similar to operation S403, and thus is not repeated here.

In an implementation, the method may further include: determining the pulse sequence of the current computing core circuit to be transmitted. For example, a pulse of each neuron in the current computing core circuit to be transmitted may be determined according to a pulse signal received by the current computing core circuit and a synaptic weight matrix. It will be appreciated that the pulse sequence of the current computing core circuit to be transmitted may be determined in a manner well known in relevant knowledge, which is not limited in the present disclosure.

In an implementation, the method may further include: storing the pulse sequence to be transmitted. For example, at each pulse transmission time, the pulse of each neuron in the current computing core circuit to be transmitted may be stored by a storage module.

In the present disclosure, a pulse sequence determined by the pulses of the neurons in the current computing core to be transmitted is encoded to obtain at least one encoded pulse sequence, and a corresponding route packet is determined according to the encoded pulse sequence to send the route packet. According to the data processing method based on a spiking neural network of the present disclosure, the pulse sequence to be transmitted is encoded before data transmission, thereby reducing the amount of pulse data desired to be transmitted in data transmission, and effectively improving the processing efficiency of the neuromorphic chip on pulse data.

Figure 6:
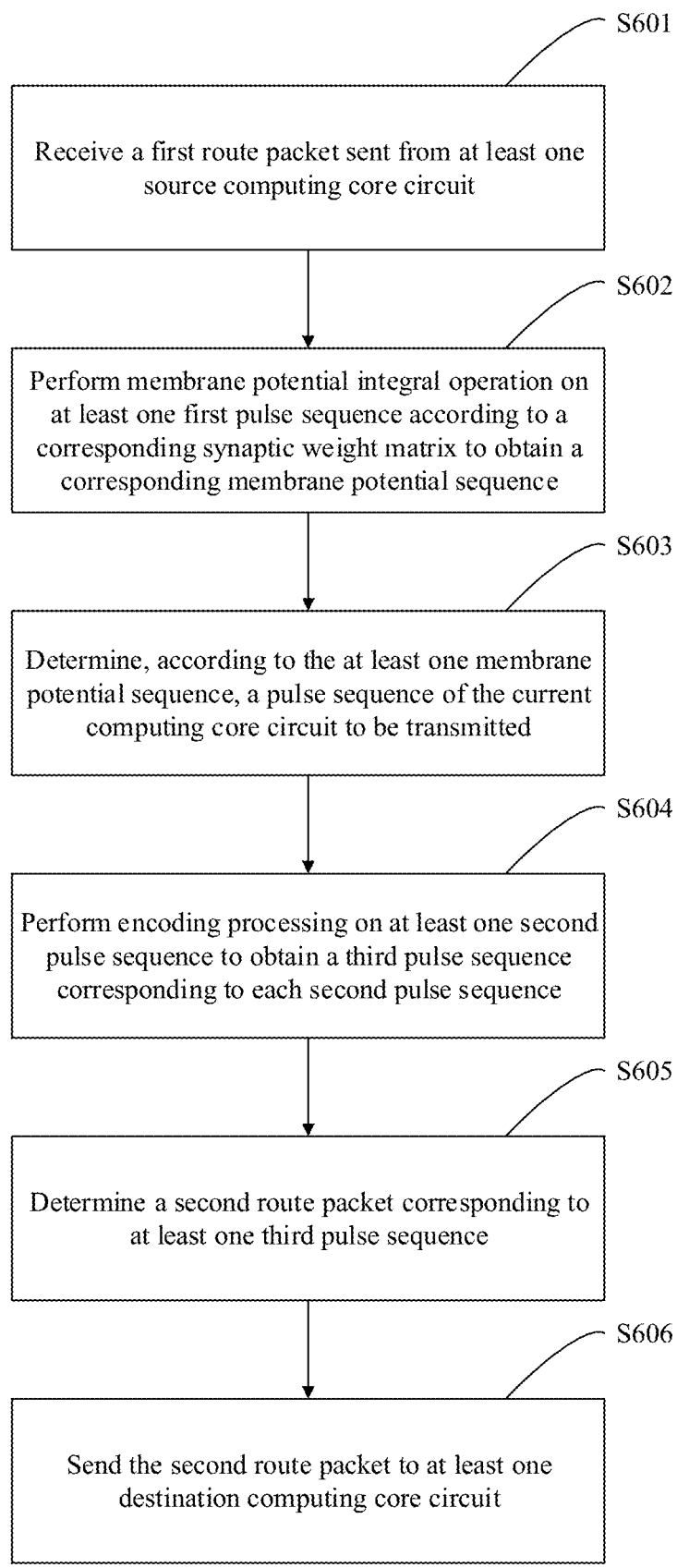
FIG. 6 is a flowchart of a data processing method based on a spiking neural network according to the present disclosure.

FIG. 6 is a flowchart of a data processing method based on a spiking neural network according to the present disclosure. As shown in FIG. 6, the method includes the following operations S601 to S606.

At operation S601, a first route packet sent from at least one source computing core circuit is received.

In this operation, the control module may control the route receiving module to receive a first route packet sent from at least one source computing core circuit. The first route packet includes a first pulse sequence. In the present disclosure, the first pulse sequence is obtained by performing encoding processing on a fourth pulse sequence by a corresponding source computing core. The fourth pulse sequence includes a pulse of at least one neuron in the source computing core to be transmitted, and the pulses in the fourth pulse sequence have consecutive transmitting addresses. Optionally, for the process of obtaining the first pulse sequence by performing encoding processing on the fourth pulse sequence by the source computing core, reference may be made to any one of the above method embodiments, and thus is not described in detail here.

At operation S602, membrane potential integral operation is performed on at least one first pulse sequence according to a corresponding synaptic weight matrix to obtain a corresponding membrane potential sequence.

The spiking neural network shown in FIG. 1 is taken as an example for explanation. Assuming that the computing core 11 is a current computing core, a connection weight between an $i^{th}$ neuron in the computing core 11 and a $j^{th}$ neuron (j∈(1, p) and is an integer) in a second layer structure (i.e., a destination computing core) is an element in a $j^{th}$ row and an $i^{th}$ column of the synaptic weight matrix corresponding to the computing core 11. That is, the $i^{th}$ column of the synaptic weight matrix corresponds to the $i^{th}$ neuron in the current computing core, and the $j^{th}$ row of the synaptic weight matrix corresponds to the $j^{th}$ neuron in the destination computing core.

The synaptic weight matrix is a dense matrix (i.e., including a larger number of non-zero elements), but the fourth pulse sequence is a sparse matrix (i.e., including a larger number of zero elements). When the membrane potential integral operation is performed on the current computing core, the operation is performed regardless of whether the value in the fourth pulse sequence is 1 or not. As a result, when the synaptic weight matrix has relatively large dimensions, the computation volume of the membrane potential integral operation is huge.

In the present disclosure, the first route packet further includes a first valid address corresponding to the first pulse sequence. The first valid address is a transmitting address of a second reference pulse in the fourth pulse sequence. Similar to the first reference pulse, the second reference pulse may be a first or last pulse to be transmitted in the fourth pulse sequence. Therefore, in an implementation of the present disclosure, after the first valid address is known, the control module may control the address hopping control module to determine, according to the first valid address and the first pulse sequence, an address of a synaptic weight valid row in the synaptic weight matrix, and determine a synaptic weight of the valid row, and then control the integration issuance processing module to perform membrane potential integral operation according to the synaptic weight of the valid row to determine a membrane potential sequence corresponding to the first pulse sequence. In the present disclosure, the membrane potential in the membrane potential sequence may be a soma charging voltage or a soma charging current, which is not particularly limited in this embodiment.

For example, when the first pulse sequence is 111100111111, and the preset bit width is 4, the control module may control the address hopping control module to determine that the quantity of consecutive 0s in the first pulse sequence does not exceed 15, and the quantity of consecutive 0s in the fourth pulse sequence corresponding to the first pulse sequence is represented in binary by 1111, 0011 and 1111. That is, the fourth pulse sequence includes two pulses of value 1, which are the 19th and 35th pulses in the fourth pulse sequence. When the first valid address corresponding to the first pulse sequence is $n_{2,1}$, the addresses of synaptic weight valid rows in the synaptic weight matrix are $n_{2,19}$ and $n_{2,35}$.

Figure 7:
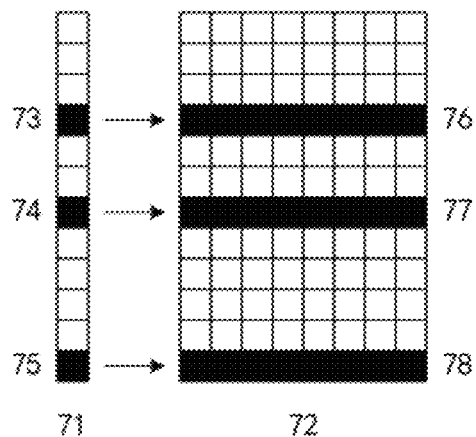
FIG. 7 is a schematic diagram of determining an address of a synaptic weight valid row according to a first pulse sequence in an implementation of the present disclosure.

FIG. 7 is a schematic diagram of determining an address of a synaptic weight valid row according to a first pulse sequence in an implementation of the present disclosure. As shown in FIG. 7, 71 is the fourth pulse sequence corresponding to the current computing core, and 72 is the synaptic weight matrix corresponding to the current computing core. As shown, 73, 74 and 75 are pulses with value 1, which are determined by the address hopping control module under control of the control module according to the first pulse sequence corresponding to the fourth pulse sequence; 76. 77, and 78 are respectively addresses of synaptic weight valid rows corresponding to pulses 73, 74, and 75, which are determined by the address hopping control module under control of the control module according to the first valid address corresponding to the first pulse sequence.

The membrane potential integral operation process may be expressed by:

I=XW;

where I is the membrane potential sequence, X is the fourth pulse sequence, and W is the synaptic weight matrix corresponding to the current computing core.

After the control module controls the address hopping control module to determine the address of the synaptic weight valid row and the synaptic weight of the valid row, the above-mentioned membrane potential integral operation process may be omitted, and it is sufficient to perform membrane potential integral operation in a compression domain. For example, the integration issuance processing module may be controlled to sum synaptic weights of valid rows in columns corresponding to the neurons in the synaptic weight matrix, to determine a membrane potential of at least one neuron, thereby determining at least one membrane potential sequence in the current computing core according to the membrane potential of the at least one neuron. In this manner, the operation volume consumed in the membrane potential integral operation process is effectively reduced, computation of a plurality of neurons can be performed in parallel, and the operation efficiency of the membrane potential integral operation process is improved.

For example, the synaptic weights of the valid rows in the synaptic weight matrix are (5, 3, 2, 2), (1, 2, 3, 3), and (3, 2, 4, 9), neuron n1 corresponds to the first column, neuron n2 corresponds to the second column, neuron n3 corresponds to the third column, and neuron n4 corresponds to the fourth column. Then, taking neuron n1 as an example, the membrane potential corresponding to neuron n1 is 5+1+3=9.

At operation S603, according to the at least one membrane potential sequence, a pulse sequence of the current computing core circuit to be transmitted is determined.

In this operation, the control module may control the integration issuance processing module to perform soma operation in various existing manners. For example, a pulse to be transmitted may be determined according to a membrane potential of at least one neuron, so as to determine a pulse sequence to be transmitted according to the pulse of each neuron to be transmitted.

At operation S604, encoding processing is performed on at least one second pulse sequence in the pulse sequence to be transmitted to obtain a third pulse sequence corresponding to each second pulse sequence.

In this example, operation S604 is implemented in a manner similar to operation S401, and thus is not repeated here.

At operation S605, a second route packet corresponding to at least one third pulse sequence is determined.

In this example, operation S605 is implemented in a manner similar to operation S402, and thus is not repeated here.

At operation S606, the second route packet is sent to at least one destination computing core circuit.

In this example, operation S606 is implemented in a manner similar to operation S403, and thus is not repeated here.

In the present disclosure, after receiving the pulse sequence and valid address sent from the at least one source computing core circuit, the membrane potential integral operation is performed on at least one pulse sequence according to a synaptic weight matrix corresponding to the current computing core to obtain at least one membrane potential sequence corresponding to the current computing core circuit, and a pulse sequence to be transmitted corresponding to the current computing core circuit is determined according to the at least one membrane potential sequence, then the pulse sequence determined by the at least one pulse to be transmitted in the pulse sequence to be transmitted is encoded to obtain an encoded pulse sequence, and a corresponding route packet is determined according to the encoded pulse sequence to send the route packet. According to the data processing method based on a spiking neural network of the present disclosure, the pulse sequence of the current computing core is encoded before data transmission, and the pulse sequence with consecutive transmitting addresses is compressed and expressed by means of the sparsity of neuron transmission, thereby reducing the amount of pulse data desired to be transmitted in data transmission, and significantly reducing the communication transmission overhead, and effectively improving the processing efficiency of the neuromorphic chip on pulse data. Meanwhile, when the encoded pulse data sent from the source computing core circuit are received, there is no need to decode the received encoded pulse data due to the sparsity of the pulse data sent from the source computing core circuit, and redundant integral operation can be skipped by determining synaptic weight valid rows, thereby effectively reducing the operation complexity. In the integral operation, a plurality of neurons of the current computing core circuit can compute in parallel, thereby improving the operating efficiency.

Figure 8:
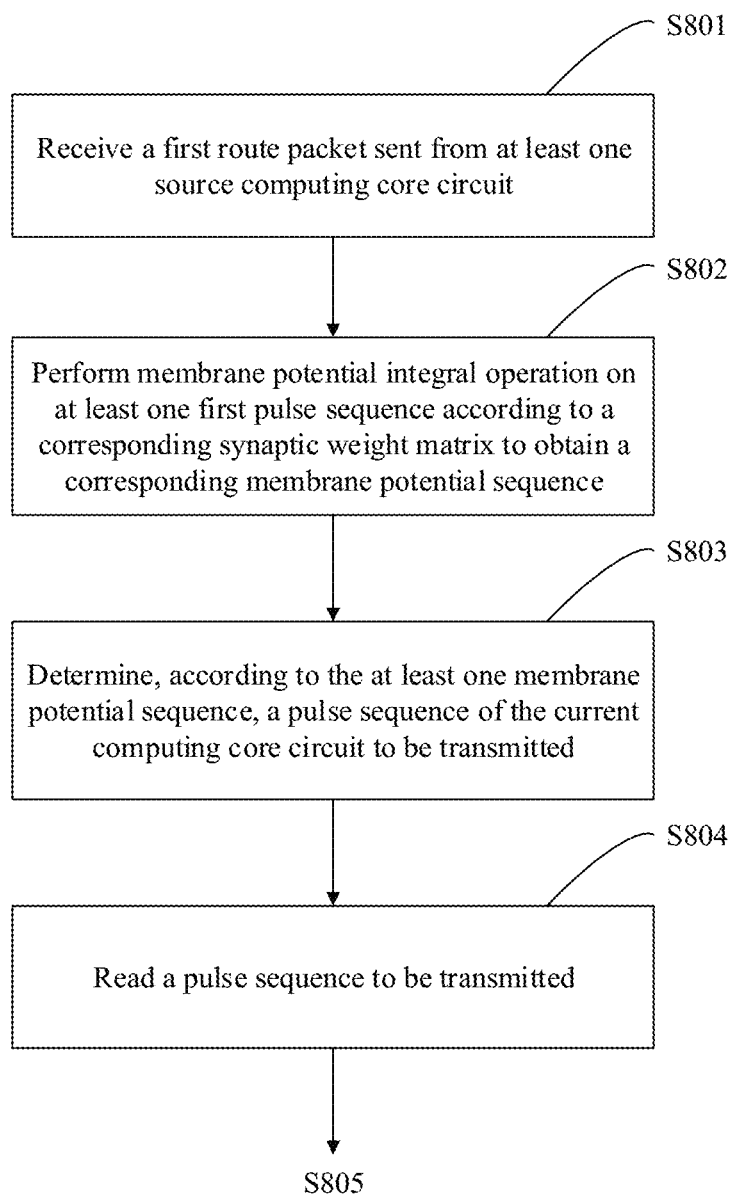
FIGS. 8 to 9 are flowcharts of a data processing method based on a spiking neural network according to the present disclosure.
Figure 9:
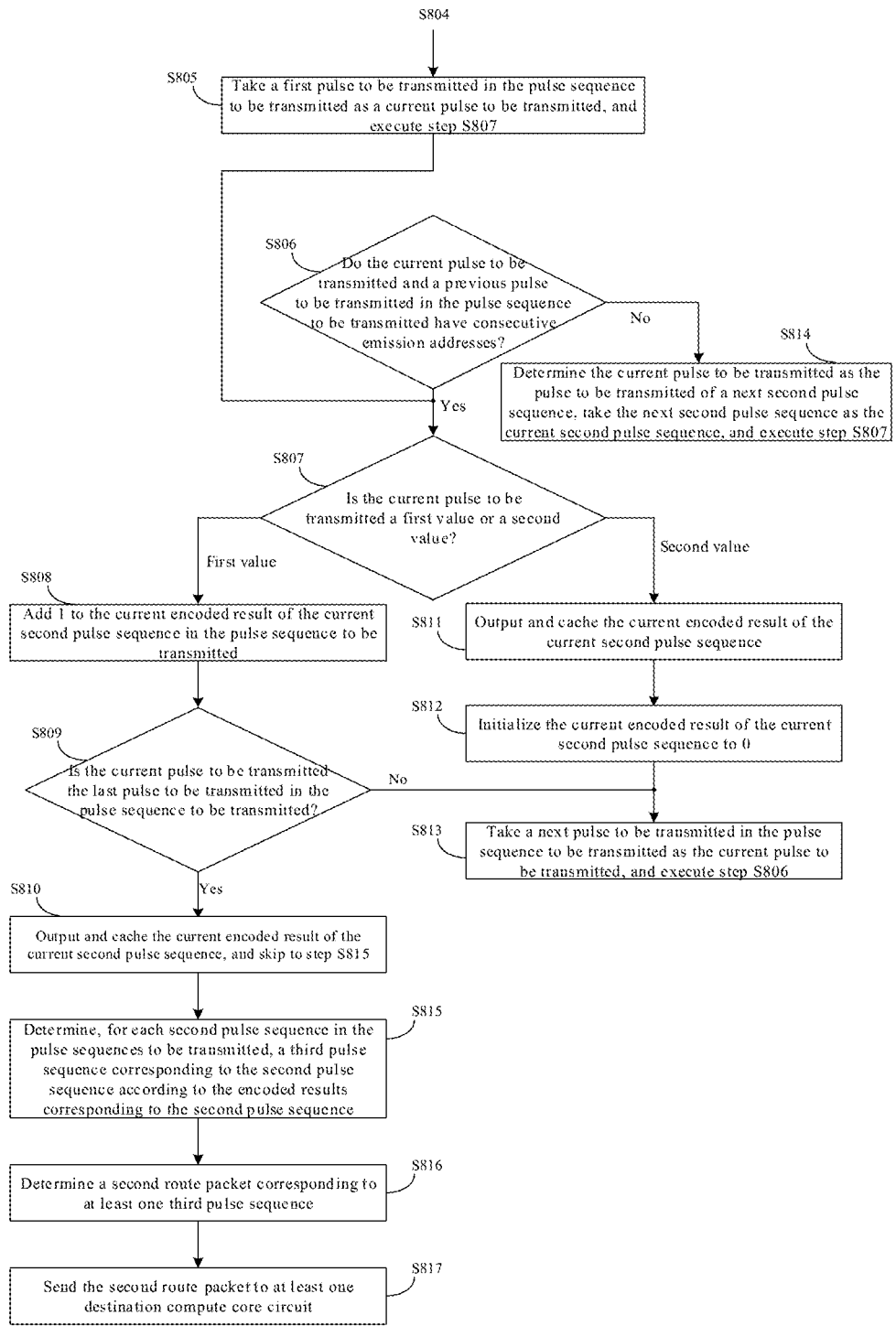

FIGS. 8 to 9 are flowcharts of a data processing method based on a spiking neural network according to the present disclosure. As shown in FIGS. 8 to 9, the method includes the following operations S801 to S817.

At operation S801, a first route packet sent from at least one source computing core circuit is received.

In this example, operation S801 is implemented in a manner similar to operation S601, and thus is not repeated here.

At operation S802, membrane potential integral operation is performed on at least one first pulse sequence according to a corresponding synaptic weight matrix to obtain a corresponding membrane potential sequence.

In this example, operation S802 is implemented in a manner similar to operation S602, and thus is not repeated here.

At operation S803, according to the at least one membrane potential sequence, a pulse sequence of the current computing core circuit to be transmitted is determined.

In this example, operation S803 is implemented in a manner similar to operation S603, and thus is not repeated here.

At operation S804, a pulse sequence to be transmitted is read.

In this example, operation S804 is implemented in a manner similar to operation S501, and thus is not repeated here.

At operation S805, a first pulse to be transmitted in the pulse sequence to be transmitted is taken as a current pulse to be transmitted, the first pulse to be transmitted is taken as the pulse to be transmitted in a current second pulse sequence in the pulse sequence to be transmitted, and operation S807 is executed.

In this example, operation S805 is implemented in a manner similar to operation S502A, and thus is not repeated here.

At operation S806, it is identifed whether the current pulse to be transmitted and a previous pulse to be transmitted in the pulse sequence to be transmitted have consecutive transmitting addresses, and operation S807 is executed if the current pulse to be transmitted and the previous pulse to be transmitted in the pulse sequence to be transmitted have consecutive addresses; otherwise, operation S814 is executed.

In this example, operation S806 is implemented in a manner similar to operation S502B, and thus is not repeated here.

At operation S807, it is identified whether the current pulse to be transmitted is a first value or a second value, operation S808 is executed if the current pulse to be transmitted is the first value, and operation S811 is executed if the current pulse to be transmitted is the second value.

In this example, operation S807 is implemented in a manner similar to operation S503, and thus is not repeated here.

At operation S808, 1 is added to the current encoded result of the current second pulse sequence in the pulse sequence to be transmitted.

In this example, operation S808 is implemented in a manner similar to operation S504, and thus is not repeated here.

At operation S809, it is determined whether the current pulse to be transmitted is the last pulse to be transmitted in the pulse sequence to be transmitted, and operation S810 is executed if the current pulse to be transmitted is the last pulse to be transmitted in the pulse sequence to be transmitted; otherwise, operation S813 is executed.

In this example, operation S809 is implemented in a manner similar to operation S505, and thus is not repeated here.

At operation S810, the current encoded result of the current second pulse sequence is output and cached, and skip to operation S815.

In this example, operation S810 is implemented in a manner similar to operation S506, and thus is not repeated here.

At operation S811, the current encoded result of the current second pulse sequence is output and cached.

In this example, operation S811 is implemented in a manner similar to operation S507, and thus is not repeated here.

At operation S812, the current encoded result of the current second pulse sequence is initialized to 0.

In this example, operation S812 is implemented in a manner similar to operation S508, and thus is not repeated here.

At operation S813, a next pulse to be transmitted in the pulse sequence to be transmitted is taken as the current pulse to be transmitted, and operation S806 is executed.

In this example, operation S813 is implemented in a manner similar to operation S509, and thus is not repeated here.

At operation S814, the current pulse to be transmitted is determined as the pulse to be transmitted in a next second pulse sequence, the next second pulse sequence is taken as the current second pulse sequence, the current encoded result of the current second pulse sequence is initialized to 0, and operation S807 is executed.

In this example, operation S814 is implemented in a manner similar to operation S510, and thus is not repeated here.

At operation S815, for each second pulse sequence in the pulse sequence to be transmitted, a third pulse sequence corresponding to the second pulse sequence is determined according to the encoded results corresponding to the second pulse sequence.

In this example, operation S815 is implemented in a manner similar to operation S511, and thus is not repeated here.

At operation S816, a second route packet corresponding to at least one third pulse sequence is determined.

In this example, operation S816 is implemented in a manner similar to operation S402, and thus is not repeated here.

At operation S817, the second route packet is sent to at least one destination computing core circuit.

In this example, operation S817 is implemented in a manner similar to operation S403, and thus is not repeated here.

Figures 10, 11:
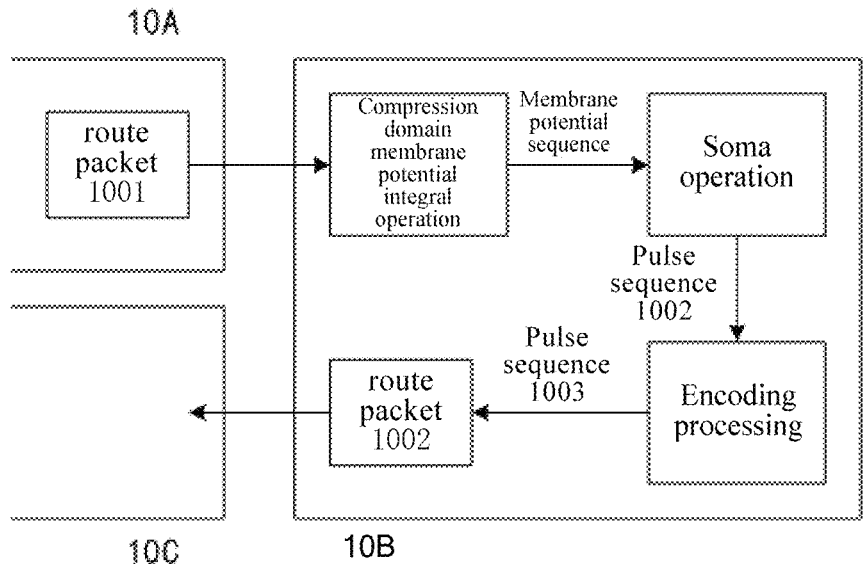
FIG. 10 is a schematic diagram showing inter-core pulse data transmission according to the present disclosure.
FIG. 11 is a table of transmission bandwidths and integral operation amounts of a neuromorphic chip according to the present disclosure.

FIG. 10 is a schematic diagram showing inter-core pulse data transmission according to the present disclosure. As shown in FIG. 10, 10A is a source computing core, 10B is a current computing core, and 10C is a destination computing core. The computing core 10A sends a route packet 1001 to the computing core 10B, and the route packet 1001 is a second route packet corresponding to the computing core 10A, as well as a first route packet corresponding to the computing core 10B. The route packet 1001 includes: a third pulse sequence corresponding to the computing core 10A, i.e., a first pulse sequence corresponding to the computing core 10B, and a second valid address of the third pulse sequence corresponding to the computing core 10A, i.e., a first valid address of the first pulse sequence corresponding to the computing core 10B. A control module of the computing core 10B controls a route receiving module of the computing core 10B to receive the route packet 1001, and controls an integration issuance processing module of the computing core 10B and an address hopping control module of the computing core 10B to perform membrane potential integral operation on at least one first pulse sequence corresponding to the computing core 10B in a compression domain according to the synaptic weight corresponding to the computing core 10B, for example, controls the address hopping control module of the computing core 10B to determine, according to the first pulse sequence and the first valid address corresponding to the computing core 10B, an address of a synaptic weight valid row in the synaptic weight matrix corresponding to the computing core 10B, and determine a synaptic weight of the valid row, so that the integration issuance processing module of the computing core 10B is controlled to perform membrane potential integral operation according to the synaptic weight of the valid row to determine a membrane potential sequence corresponding to the first pulse sequence. Then, the control module of the computing core 10B controls the integration issuance processing module of the computing core 10B to perform soma operation. For example, the control module of the computing core 10B controls the integration issuance processing module of the computing core 10B to determine, according to the at least one membrane potential sequence, a pulse sequence to be transmitted, i.e., pulse sequence 1002, of the computing core 10B. Furthermore, the control module of the computing core 10B controls an encoding module of the computing core 10B to perform encoding processing on the pulse sequence 1002 in a compressed encoding mode based on a quantity of consecutive 0s, to obtain at least one third pulse sequence, i.e., pulse sequence 1003, of the computing core 10B, and determine a second valid address corresponding to each pulse sequence 1003. Accordingly, the control module of the computing core 10B controls a route sending module of the computing core 10B to determine a route packet 1002, according to each pulse sequence 1003 and the corresponding second valid address, and controls the route sending module of the computing core 10B to send the route packet 1002 to the computing core 10C. The route packet 1002 is a second route packet of the computing core 10B, as well as a first route packet of the computing core 10C.

FIG. 11 is a table of transmission bandwidths and integral operation amounts of a neuromorphic chip according to the present disclosure. The pulses are stored in bytes, and before encoding, the pulse sequences (namely, the pulse sequences to be transmitted) have sequence lengths N of 1024 and 256, and occupy data bandwidths of N/8 Bytes with a bit width m=8. As shown in FIG. 11, the first column in the list is configured to represent a proportion (i.e., an transmission density) of pulses to be transmitted with value 1 in the pulse sequence to be transmitted, the second column is configured to represent a transmission bandwidth occupied by the pulse sequence before encoding, the third column is configured to represent a transmission bandwidth occupied by the pulse sequence after encoding (i.e., the third pulse sequence), and the fourth column is configured to represent an operation volume saved by the computing core when performing membrane potential integral operation. As can be seen from FIG. 11, for different pulse sequences with different transmission densities, the neuromorphic chip of the present disclosure can effectively reduce the transmitted data amount and the operation volume of membrane potential integral operation, thereby effectively improving the processing efficiency of the neuromorphic chip on pulse data.

In the present disclosure, after receiving the pulse sequence and valid address sent from the at least one source computing core circuit, the membrane potential integral operation is performed on at least one pulse sequence according to a synaptic weight matrix corresponding to the current computing core to obtain at least one membrane potential sequence corresponding to the current computing core circuit, and a pulse sequence to be transmitted corresponding to the current computing core circuit is determined according to the at least one membrane potential sequence, then the pulse sequence determined by the at least one pulse to be transmitted in the pulse sequence to be transmitted is encoded to obtain an encoded pulse sequence, and a corresponding route packet is determined according to the encoded pulse sequence to send the route packet. According to the data processing method based on a spiking neural network of the present disclosure, the pulse sequence of the current computing core is encoded before data transmission, thereby reducing the amount of pulse data desired to be transmitted in data transmission, and effectively improving the processing efficiency of the neuromorphic chip on pulse data.

Optionally, in the above method embodiment, the control module may control the storage module to store at least one of the pulse sequence to be transmitted and the third pulse sequence, so that the encoding module may read the pulse sequence of the current computing core to be transmitted from the storage module, and the route sending module may read the third pulse sequence from the storage module to determine, according to the third pulse sequence and the second valid address, a corresponding second route packet. It will be appreciated that the storage module may include various forms, and a same memory or different memories may be used to store the pulse sequence to be transmitted and the at least one third pulse sequence, which is not limited in the present disclosure.

Figure 12:
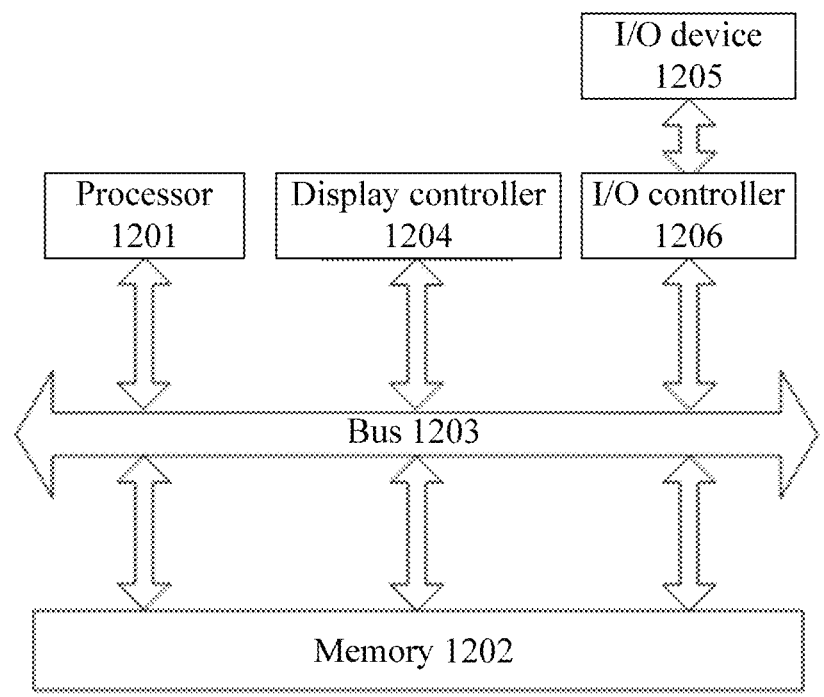
FIG. 12 is a schematic diagram of an electronic device according to the present disclosure.

FIG. 12 is a schematic diagram of an electronic device according to the present disclosure. The electronic device shown in FIG. 12 is a general-purpose data processing device, including a general-purpose computer hardware structure including at least a processor 1201 and a memory 1202. The processor 1201 and the memory 1202 are connected via a bus 1203. The memory 1202 is adapted to store instructions or programs executable by the processor 1201. The processor 1201 may be a stand-alone microprocessor or a collection of one or more microprocessors. Therefore, the processor 1201 executes the instructions or programs stored in the memory 1202 to perform the methods of the embodiments of the present disclosure as described above, thereby implementing processing of data and control of other devices. The bus 1203 connects the above components together, and connects the above components to a display controller 1204, a display device, and an input/output (I/O) device 1205. The I/O device 1205 may be a mouse, a keyboard, a modem, a network interface, a touch input device, a motion sensitive input device, a printer, or other devices known in the art. Typically, the I/O device 1205 is connected to the system through an I/O controller 1206.

The memory 1202 may store software components, such as an operating system, a communication module, an interaction module, and an application. Each module or application described above corresponds to a set of executable program instructions for implementing one or more functions or methods described in the embodiments of the present disclosure.

Figure 13:
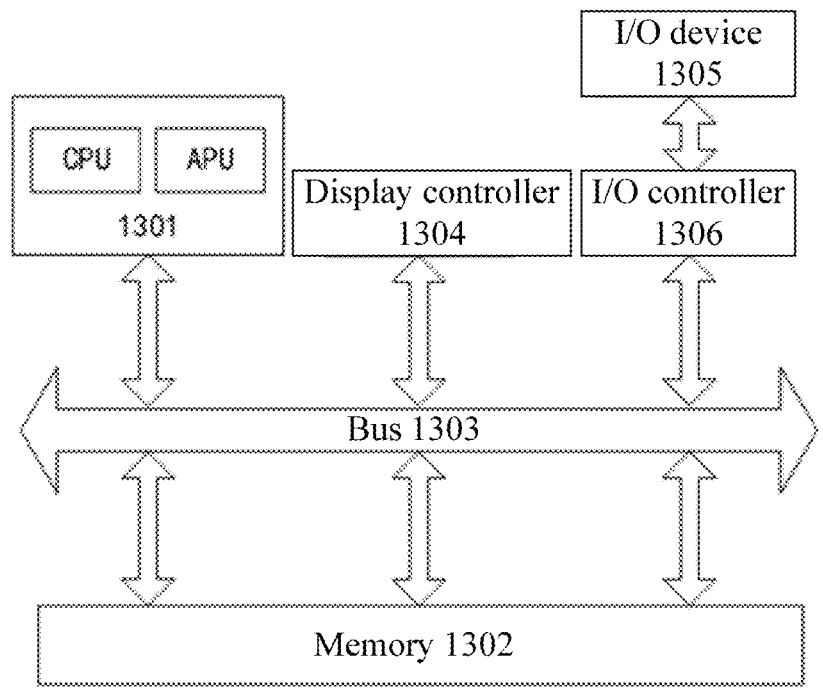
FIG. 13 is a schematic diagram of an electronic device according to the present disclosure.

FIG. 13 is a schematic diagram of an electronic device according to the present disclosure. The electronic device shown in FIG. 13 is a non-general data processing device, including at least a board card 1301 and a memory 1302. The board card 1301 and the memory 1302 are connected via a bus 1303. The memory 1302 is adapted to store instructions or programs executable by the board card 1301. The board card 1301 includes at least one neuromorphic chip according to the embodiments of the present disclosure. Further, the neuromorphic chip includes at least one central processing unit (CPU) and at least one accelerated processing unit (APU). Further, the APU includes at least one computing core circuit according to the embodiments of the present disclosure. Therefore, the board card 1301 executes the instructions or programs stored in the memory 1302 to perform the method of the embodiments of the present disclosure as described above, thereby implementing processing of data and control of other devices. The bus 1303 connects the above components together, and connects the above components to a display controller 1304, a display device, and an I/O device 1305. The I/O device 1305 may be a mouse, a keyboard, a modem, a network interface, a touch input device, a motion sensitive input device, a printer, or other devices known in the art. Typically, the I/O device 1305 is connected to the system through an I/O controller 1306.

The memory 1302 may store software components, such as an operating system, a communication module, an interaction module, and an application. Each module or application described above corresponds to a set of executable program instructions for implementing one or more functions or methods described in the embodiments of the present disclosure.

The flowcharts and/or block diagrams of the method, the apparatus (system) and the computer program product according to embodiments of the present disclosure describe various aspects of the present disclosure. It will be appreciated that each block of the flowcharts and/or block diagrams, and combinations of blocks in the flowcharts and/or block diagrams, can be implemented through computer program instructions. These computer program instructions may be provided to a processor of a general purpose computer, a dedicated computer, or other programmable data processing apparatus to produce a machine, such that the instructions, which execute via the processor of the computer or other programmable data processing apparatus, create means for implementing the functions/acts specified in the flowchart and/or block diagram block or blocks.

Also, as will be appreciated by one skilled in the art, various aspects of the embodiments of the present disclosure may be embodied in a system, a method or a computer program product. Therefore, various aspects of embodiments of the present disclosure may take the form of: an entirely hardware implementation, an entirely software implementation (including firmware, resident software, microcode, etc.) or an implementation combining software and hardware aspects that may be generally referred to herein as a "circuit", a "module" or a "system". Further, various aspects of the present disclosure may take the form of: a computer program product embodied in one or more computer-readable media having a computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination thereof. More specific examples (a non-exhaustive list) of the computer-readable storage medium would include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of the embodiments of the present disclosure, a computer-readable storage medium may be any tangible medium that can contain or store a program for use by or in connection with an instruction execution system, an apparatus, or a device. The instructions, when executed by a processor, may cause any of the methods according to the embodiments of the present disclosure to be implemented.

The computer-readable signal medium may include a propagated data signal with a computer-readable program code embodied therein, for example, in a baseband or as part of a carrier wave. Such a propagated signal may take any of a variety of forms, including, but not limited to: electromagnetic or optical signals, or any suitable combination thereof. The computer-readable signal medium may be any of the following computer-readable media: non-transitory computer-readable storage medium and may communicate, propagate or transmit a program for use by or in connection with an instruction execution system, an apparatus, or a device.

The computer program code for carrying out operations of various aspects of the of the present disclosure may be written in any combination of one or more programming languages, including: object-oriented programming languages such as Java™, Smalltalk, C++, PHP, Python™, and the like; and conventional procedural programming languages, such as the "C" programming language, or the like. The program code may be executed entirely or partially on a user computer, as a stand-alone software package; partially on a user computer and partially on a remote computer, or entirely on a remote computer or server. In the latter case, the remote computer may be connected to the user's computer through any type of network, including a local area network (LAN) or a wide area network (WAN), or connected to an external computer (for example, through the Internet provided by an Internet service provider).

The descriptions above are only preferred embodiments of the present disclosure, and are not intended to limit the present disclosure. For those skilled in the art, the present disclosure may have various changes and variations. Any amendments, equivalent substitutions, improvements, or the like within the principle of the present disclosure are all included in the scope of the protection defined by the appended claims of the present disclosure.

What is claimed is:

1. A data processing method based on a spiking neural network, comprising:
performing encoding processing on at least one first pulse sequence to obtain a second pulse sequence corresponding to each first pulse sequence, wherein the first pulse sequence comprises a pulse of at least one neuron in a current computing core circuit to be transmitted, and the pulses to be transmitted in the first pulse sequence have consecutive transmitting addresses;
determining a first route packet corresponding to at least one second pulse sequence; and
sending the first route packet to at least one destination computing core circuit, wherein values of the pulses in the first pulse sequence comprise a first value and a second value, and performing encoding processing on at least one first pulse sequence to obtain the second pulse sequence corresponding to the first pulse sequence comprises:

determining a quantity of consecutive first values before each second value in the first pulse sequence; and determining, according to the determined quantity of consecutive first values before each second value in the first pulse sequence, the second pulse sequence corresponding to the first pulse sequence, wherein the determined quantity of consecutive first values before each second value in the first pulse sequence is represented in binary, and is determined as the second pulse sequence corresponding to the first pulse sequence.

2. The method according to claim 1, further comprising:
reading a pulse sequence of the current computing core circuit to be transmitted, and determining at least one pulse to be transmitted with consecutive transmitting addresses in the pulse sequence to be transmitted as the first pulse sequence.

3. The method according to claim 1, wherein determining the first route packet corresponding to at least one second pulse sequence comprises:

determining, according to the second pulse sequence and a first valid address, the first route packet corresponding to the second pulse sequence, wherein the first valid address is a transmitting address of a first reference pulse in the first pulse sequence.

4. The method according to claim 1, further comprising:
receiving a second route packet sent from at least one source computing core circuit, wherein the second route packet comprises a third pulse sequence obtained by performing encoding processing on a fourth pulse sequence by a corresponding source computing core circuit, and the pulses in the fourth pulse sequence have consecutive transmitting addresses;

performing membrane potential integral operation on at least one third pulse sequence according to a corresponding synaptic weight matrix to obtain a corresponding membrane potential sequence formed by a membrane potential of at least one neuron in the current computing core circuit; and determining, according to the at least one membrane potential sequence, a pulse sequence of the current computing core circuit to be transmitted.

5. The method according to claim 4, wherein the second route packet further comprises a second valid address corresponding to the third pulse sequence, wherein the second valid address is a transmitting address of a second reference pulse in the fourth pulse sequence, and performing membrane potential integral operation on at least one third pulse sequence according to the corresponding synaptic weight matrix to obtain the corresponding membrane potential sequence comprises:

determining, according to the second valid address and the third pulse sequence, an address of a synaptic weight valid row in the synaptic weight matrix, and determining a synaptic weight of the valid row; and performing membrane potential integral operation according to the synaptic weight of the valid row to determine the membrane potential sequence corresponding to the third pulse sequence.

6. The method according to claim 1, further comprising:
storing at least one of the pulse sequence to be transmitted and the second pulse sequence, wherein the pulse sequence to be transmitted comprises at least one first pulse sequence.

7. A computing core circuit, comprising:
a processor; and
a memory storing instructions executable by the processor;

wherein the processor is configured to execute the instructions stored in the memory to perform the method according to claim 1.

8. An accelerated processing unit, comprising a plurality of computing core circuits, wherein each computing core circuit of the plurality of computing core circuits comprises:
a processor; and
a memory storing instructions executable by the processor;

wherein the processor is configured to execute the instructions stored in the memory to perform the method according to claim 1.

9. A chip, comprising at least one computing core circuit according to claim 7, and a network-on-chip configured to establish a communication connection for the at least one computing core circuit.

10. A board card, comprising at least one chip according to claim 9.

11. An electronic device, comprising at least one chip according to claim 9.

12. A non-transitory computer-readable storage medium having computer program instructions stored thereon which, when executed by a processor, cause the method according to claim 1 to be implemented.

* * * * *